(12) United States Patent
Lindoff et al.

(10) Patent No.: US 12,222,126 B2
(45) Date of Patent: Feb. 11, 2025

(54) METHOD AND DEVICE FOR CONTROLLING INDOOR CLIMATE IN A PORTION OF A BUILDING

(71) Applicant: E.ON SVERIGE AB, Malmo (SE)

(72) Inventors: Bengt Lindoff, Bjärred (SE); Per Rosén, Lund (SE); Jacob Skogström, Lomma (SE); Fredrik Rosenqvist, Helsingborg (SE); Helen Carlström, Bjärred (SE)

(73) Assignee: E.ON SVERIGE AB, Malmo (SE)

( * ) Notice: Subject to any disclaimer, the term of this patent is extended or adjusted under 35 U.S.C. 154(b) by 403 days.

(21) Appl. No.: 17/595,041

(22) PCT Filed: Apr. 17, 2020

(86) PCT No.: PCT/EP2020/060857
§ 371 (c)(1),
(2) Date: Nov. 5, 2021

(87) PCT Pub. No.: WO2020/224934
PCT Pub. Date: Nov. 12, 2020

(65) Prior Publication Data
US 2022/0214070 A1 Jul. 7, 2022

(30) Foreign Application Priority Data
May 9, 2019 (EP) ..................... 19173600

(51) Int. Cl.
*F24F 11/65* (2018.01)
*F24F 11/58* (2018.01)
(Continued)

(52) U.S. Cl.
CPC .............. *F24F 11/65* (2018.01); *F24F 11/58* (2018.01); *F24F 11/74* (2018.01); *F24F 11/80* (2018.01); *F24F 2120/12* (2018.01)

(58) Field of Classification Search
CPC .. F24F 11/65; F24F 11/58; F24F 11/74; F24F 11/80; F24F 2120/12; F24F 11/30; F24F 11/64; F24F 2140/50; G05D 23/1919
See application file for complete search history.

(56) References Cited

U.S. PATENT DOCUMENTS

2008/0277486 A1* 11/2008 Seem .................... H04L 67/125
236/49.3
2010/0286843 A1 11/2010 Lyon
(Continued)

FOREIGN PATENT DOCUMENTS

CN 103189687 7/2013
EP 2741020 6/2014
(Continued)

OTHER PUBLICATIONS

International Search Report and Written Opinion of PCT/EP2020/060857, Dated Jun. 24, 2020, in 14 pages.
(Continued)

*Primary Examiner* — Zhipeng Wang
(74) *Attorney, Agent, or Firm* — Knobbe, Martens, Olson & Bear, LLP

(57) ABSTRACT

A method for controlling indoor climate in a portion (102) of a building (100) is presented. The method comprises: identifying (S402), based on a wireless communication based positioning function, electronic devices (204*a*, 204*b*, 204*c*) present in the portion (102) of the building (100); for each identified electronic device, determining whether the identified electronic device is associated with a user; determining (S406) an estimated total amount of heat dissipation present in the portion (102) of the building (100) based on an amount of heat dissipation associated with the respective user to which the respective identified electronic device is associated; and controlling (S408) indoor climate in the portion (102) of the building (100) based on the estimated
(Continued)

total amount of heat dissipation present in the portion (102) of the building (100). Also, a server (106) and a system for performing the controlling are presented.

16 Claims, 4 Drawing Sheets

(51) Int. Cl.
*F24F 11/74* (2018.01)
*F24F 11/80* (2018.01)
*F24F 120/12* (2018.01)

(56) References Cited

U.S. PATENT DOCUMENTS

| 2013/0317654 | A1 | 11/2013 | Kashirajima et al. | |
| 2016/0054018 | A1* | 2/2016 | Motodani | F24F 11/30 700/276 |
| 2017/0268795 | A1* | 9/2017 | Yamamoto | F24F 11/62 |
| 2018/0266718 | A1* | 9/2018 | Gillette | F24F 11/64 |
| 2019/0017721 | A1* | 1/2019 | Motodani | F24F 11/64 |
| 2019/0101306 | A1* | 4/2019 | Giorgi | F24F 13/10 |
| 2019/0318047 | A1* | 10/2019 | Kogo | G06F 30/13 |

FOREIGN PATENT DOCUMENTS

| JP | WO2012/157573 | 7/2014 |
| KR | 10-2009-0128074 | 12/2009 |

OTHER PUBLICATIONS

Sujatha et al., "Energy Efficient Free Cooling System for Data Centers", Could Computing Technology and Science (Cloudcom), Nov. 29, 2011, pp. 646-651.

\* cited by examiner

METHOD AND DEVICE FOR CONTROLLING INDOOR CLIMATE IN A PORTION OF A BUILDING

FIELD OF THE INVENTION

The invention generally relates to control indoor climate in a portion of a building.

BACKGROUND OF THE INVENTION

Today, it is common practice to control the indoor climate in a building using a building management system. However, the controlling of the indoor climate is often troublesome since the indoor climate depend on many parameters such as outdoor climate, type of building, activity in the building. Outdoor climate and type of building are rather easy parameters to get information about. However, the activity in the building is harder to get information about. Hence, there is a need in better being able to control the indoor climate in a building.

By improving the indoor climate in a building wellbeing of the users of the building may be enhanced. Further, by improving the indoor climate in a building energy may be saved.

SUMMARY OF THE INVENTION

It is an object to mitigate, alleviate or eliminate one or more of the above-identified deficiencies in the art and disadvantages singly or in any combination and at least partly solve the above mentioned problem.

According to a first aspect a method for controlling indoor climate in a portion of a building is provided. The method comprising: identifying, based on a wireless communication based positioning function, electronic devices present in the portion of the building; for each identified electronic device, determining whether the identified electronic device is associated with a user; determining an estimated total amount of heat dissipation present in the portion of the building based on an amount of heat dissipation associated with the respective user to which the respective identified electronic device is associated; and controlling indoor climate in the portion of the building based on the estimated total amount of heat dissipation present in the portion of the building.

By the present method, the indoor climate in a portion of a building may be controlled and optimized based on users of the electronic devices being identified as being present in that specific portion of the building. By identifying not only the electronic devices present in the portion of the building but also the thereto associated users, e.g. humans, a more secure and precise way of control the indoor climate in the building is achieved. Further, by identifying e.g. a smartphone as being present in a portion of a building, the smartphone itself will not contribute much to the estimated total heat dissipation in the portion of the building, however, the user associated with the smartphone will. Moreover, by identifying a user, e.g. a human, as present in the portion of the building by identifying an electronic device associated with the user a dynamic method for identifying presence of a user in the portion of the building is provided. This since users tend to carry the electronic device with them moving around in a building or even entering or leaving the building.

Hence, by determining whether a user is associated with an electronic device user contribution to heat dissipation may been taken into account upon controlling the indoor climate in the portion of the building. Hence, a more precise control of the indoor climate may be made. Further, the present method provides for less problems with integrity, as e.g. compared with a method based on determining presence of humans using a camera. Moreover, the present method does not need any action to be performed by the human, as compared with a door passage reader based method of determining presence of humans in a building.

The identification of electronic devices is preferably made dynamically, this since the electronic devices tend to move around and may hence contribute to heat dissipation differently at different points in time.

The method may further comprise, for each identified electronic device, determining an amount of heat dissipation associated with the identified electronic device; and adding the amount of heat dissipation associated with the identified electronic device to the estimated total amount of heat dissipation present in the portion of the building.

Today, there is usually more things than humans inside a building contributing to heat dissipation in the building. As an example, different electronic devices such as computers, projectors, robots contribute to heat dissipation as well. Further, both humans and the electronic devices present in the building tend to move around and may hence contribute to heat dissipation differently at different points in time. By the present method, the indoor climate in a portion of a building may be controlled and optimized based on the electronic devices being identified as being present in that specific portion of the building. By identifying electronic devices present in the portion of the building contribution on heat dissipation in the portion of the building from electronic devices present therein may be accounted for upon controlling the indoor climate. Hence, non-human thermal devices may be accounted for upon determining the estimated total heat dissipation in the portion of the building. Accordingly, a more precise control of the indoor climate may be made.

The step of, for each identified electronic device, determining an amount of heat dissipation associated with the identified electronic device may comprise determining a type of the identified electronic device and accessing a database comprising information pertaining to heat dissipation associated with different types of electronic devices. In this context, the term "type" is to be interpreted as different electronic devices, such as, smartphones, laptops, projectors, robots, etc. Electronic device typically has a heat dissipation of various amount depending on the type of electronic device. By taking into account the type of electronic device a better estimation of the heat dissipation in the portion of the building may be made. Hence, a more precise control of the indoor climate may be made.

The step of determining an estimated total amount of heat dissipation present in the portion of the building may comprise summing the determined amounts of heat dissipation associated with the identified electronic devices.

Further, the respective user may be identified, and only an amount of heat dissipation associated with each uniquely identified user may be added to the estimated total amount of heat dissipation present in the portion of the building. An even better estimate of the estimated total heat dissipation in the portion of the building may be made. This since a specific user may only contribute once to the estimated total heat dissipation in the portion of the building.

The step of identifying electronic devices present in the portion of the building may comprise identifying the electronic devices wirelessly connected to a wireless access point associated with the portion of the building. An efficient way of identifying electronic devices in the portion of the building is provided. Further, an efficient way of portioning the building into portions is also provided.

The step of identifying electronic devices present in the portion of the building may comprise identifying electronic devices being within a range of the wireless access point associated with the portion of the building. An efficient way of identifying electronic devices in the portion of the building is provided. Further, an efficient way of portioning the building into portions is also provided.

The step of controlling indoor climate in the portion of the building may comprise controlling heating of the portion of the building. The step of controlling indoor climate in the portion of the building may comprise controlling cooling of the portion of the building. The step of controlling indoor climate in the portion of the building may comprise controlling ventilation of the portion of the building.

According to a second aspect a method for individually controlling indoor climate in each portion of a plurality of portions in a building is presented. The method comprising: for each portion of the building performing the method according to the first aspect.

The above mentioned features of the method of the first aspect, when applicable, apply to this second aspect as well. In order to avoid undue repetition, reference is made to the above.

According to a third aspect a non-transitory computer readable recording medium is provided. The non-transitory computer readable recording medium comprising program code portions recorded thereon which when executed on a device having processing capability is configured to perform the method according to the first and/or second aspect. The above mentioned features of the methods of the first and second aspect, when applicable, apply to this third aspect as well. In order to avoid undue repetition, reference is made to the above.

According to a fourth aspect server configured to control indoor climate in a portion of a building is provided. The server comprising: a control circuitry configured to execute: an electronic device identification function configured to identify electronic devices present in the portion of the building based on a wireless communication based positioning function, a heat dissipation estimation function configured to determine an estimated total amount of heat dissipation present in the portion of the building based on a summation of amounts of heat dissipation associated with users associated with the electronic devices identified as being present in the portion of the building, and an indoor climate control function configured to generate an indoor climate control signal, wherein the indoor climate control signal is based on the estimated total amount of heat dissipation present in the portion of the building; and a transceiver configured to send the indoor climate control signal to an indoor climate control assembly associated with the portion of the building. The above mentioned features of the methods of the first and second aspect, when applicable, apply to this fourth aspect as well. In order to avoid undue repetition, reference is made to the above.

The heat dissipation estimation function may further be configured to determine the estimated total amount of heat dissipation present in the portion of the building based on a summation of amounts of heat dissipation associated with the identified electronic device.

According to a fifth aspect a building management system is provided. The building management system comprising: a plurality of indoor climate control assemblies, each associated with an individual portion of a building; and a server configured to individually control indoor climate in the individual portions of the building. The server comprising: a control circuitry configured to execute: an electronic device identification function configured to identify electronic devices present in each individual portion of the building, based on a wireless communication based positioning function, a heat dissipation estimation function configured to determine an estimated total amount of heat dissipation present in each individual portion of the building based on a summation of amounts of heat dissipation associated with users associated with the electronic devices identified as being present in the individual portion of the building, and an indoor climate control function configured to for each individual portion of the building generate an indoor climate control signal, wherein each indoor climate control signal is based on the estimated total amount of heat dissipation present in the individual portion of the building; and a transceiver configured to send the indoor climate control signals to a respective one of the indoor climate control assemblies associated with the individual portion of the building.

The heat dissipation estimation function may further be configured to determine the estimated total amount of heat dissipation present in the individual portion of the building based on a summation of amounts of heat dissipation associated with the electronic devices identified as being present in the individual portion of the building.

The building management system may further comprise a plurality of wireless access points, wherein each wireless access point is associated with each individual portion of the building, wherein the electronic device identification function is configured to identify electronic devices present in an individual portion of the building by identifying electronic device wirelessly connected to the wireless access point associated the individual portion of the building and/or identifying electronic devices being within a range of the wireless access point associated with the portion of the building.

Each of the plurality of indoor climate control assemblies may comprise one or more of: a heating device configured to heat the individual portion of the building associated with the indoor climate control assembly, a cooling device configured to cool the individual portion of the building associated with the indoor climate control assembly, and a ventilation device configured to ventilate the individual portion of the building.

The above mentioned features of the methods of the first and second aspect, when applicable, apply to this fifth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
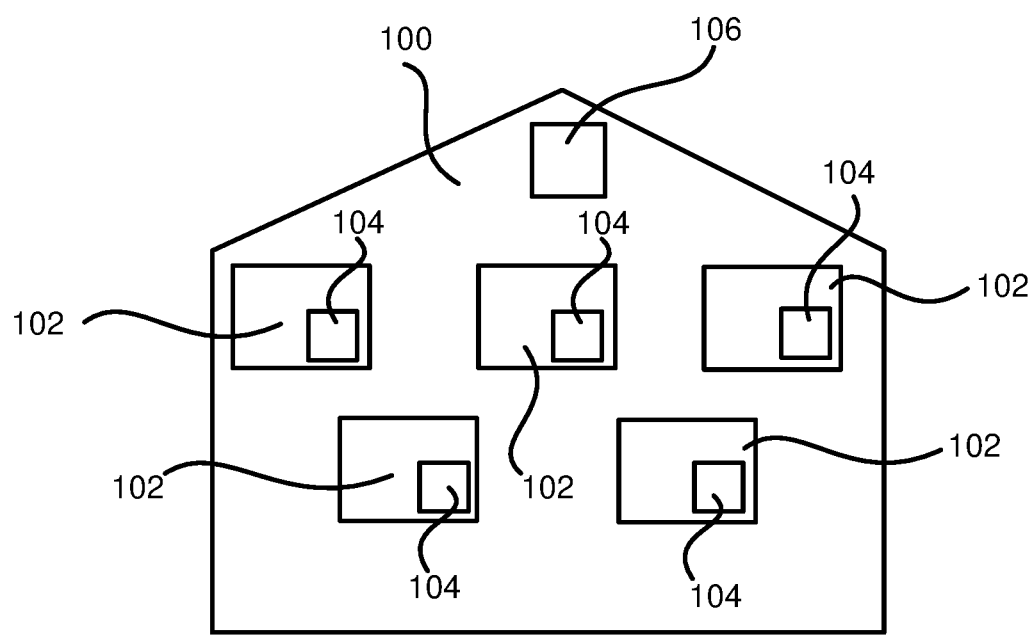
FIG. 1 is a schematic diagram of a building comprising a plurality of portions.

FIG. 1 generally illustrates a building 100 comprising a building management system. The building 100 may be any type of building, such as a residential building, commercial or office building, an apartment building, a free-standing house or an industrial building. The building management system is configured to control and monitor mechanical and electrical equipment of the building 100. The mechanical and electrical equipment may e.g. be used for controlling an indoor environment of the building 100. The building management system may be configured to individually control indoor climate in each portion 102 of the building 100. A portion 102 of the building may be a room of the building 100, wherein a room is a space of the building delimited by a floor, a ceiling and walls. However, a portion 102 of the building 100 may comprise a plurality of rooms. Alternatively, a portion 102 of the building 100 may be part of an open space of the building 100. Hence, an open space of the building 100 may be divided into a plurality of portions 102. The indoor climate in each portion 102 of the building 100 may be individually controlled. Hence, indoor climate in a portion 102 of the building 100 may be controlled separate from other portions 102 of the building 100. The building 100 comprises a plurality of portion 102. The indoor climate of each portion 102 may be controlled by an indoor climate control assembly 104. Hence, each portion 102 may be associated with a specific indoor climate control assembly 104. The indoor climate control assemblies 104 form part of the building management system. Each indoor climate control assembly 104 may comprise a heating device configured to heat the portion 102 of the building 100 associated with the indoor climate control assembly 104. Alternatively, or in combination, each indoor climate control assembly 104 may comprise a cooling device configured to cool the portion 102 of the building 100 associated with the indoor climate control assembly 104. Alternatively, or in combination, each indoor climate control assembly 104 may comprise a ventilation device configured to ventilate the portion 102 of the building 100. The building management system further comprises a server 106.

The server 106 is configured to control the indoor climate control assemblies 104. The server 106 may be configured to control the indoor climate control assemblies 104 individually. The server 106 may be positioned inside the building 100. Alternatively, the server 106 may be positioned outside the building 100. Especially, the server 106 may form part of a joint server controlling a plurality of buildings.

Figure 2:
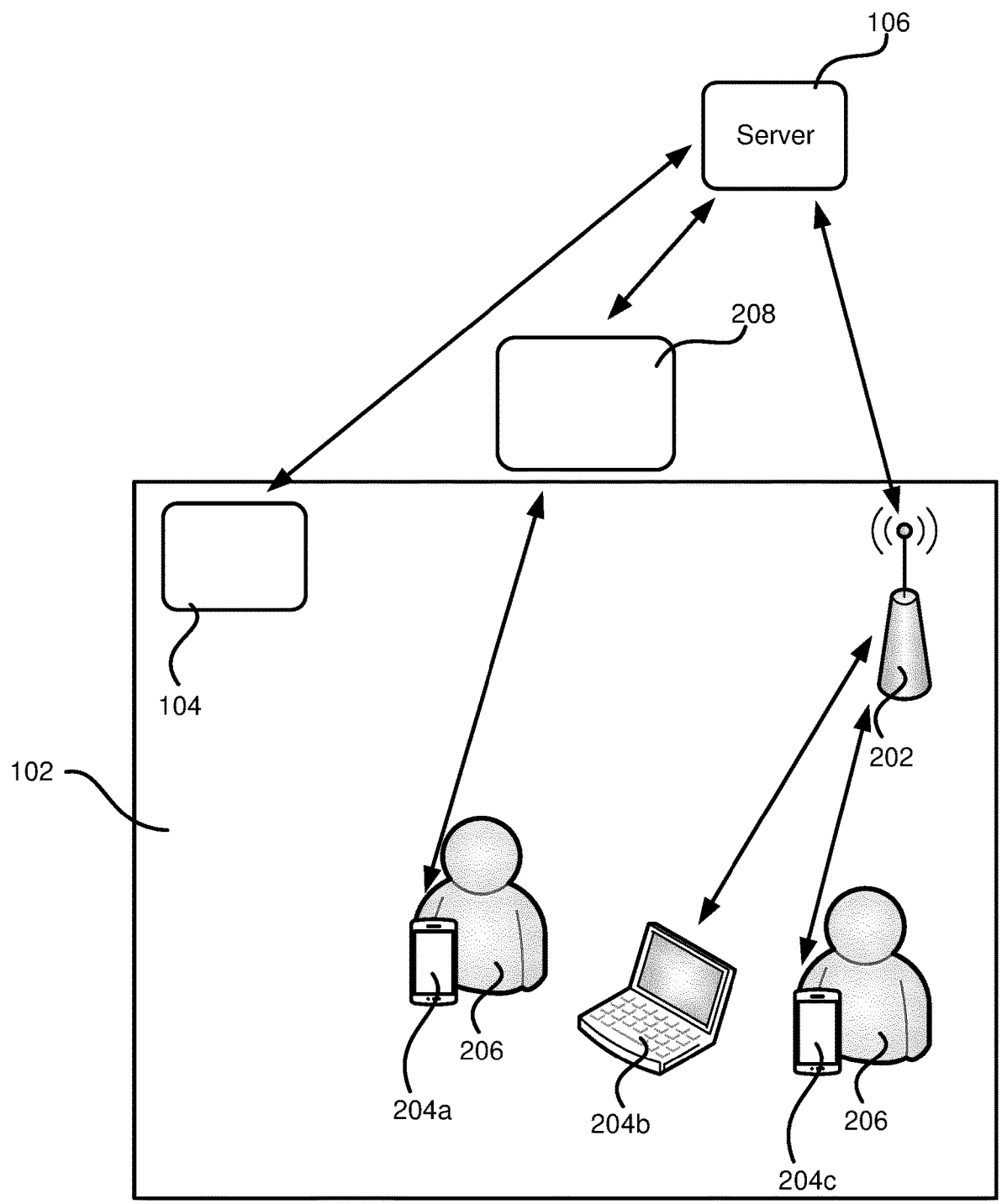
FIG. 2 is a schematic diagram of a portion in the building of FIG. 1.

FIG. 2 illustrates one portion 102 of the building 100 illustrated in FIG. 1. In addition to what have been discussed above, each portion 102 of the building 100 may be associated with a wireless access point 202. The wireless access point 202 may be configured to communicate with the server 106. The wireless access point 202 may serve the portion 102 of the building with wireless connection accessibility. The wireless connection may be made using any suitable connection protocol. Examples of such wireless connection protocols are Wi-Fi and Bluetooth. Via the wireless connection accessibility, the wireless access point 202 may service thereto connected electronic devices with access to a network, e.g. the Internet.

One or more electronic devices 204a, 204b, 204c may be present in the portion 102 of the building 100. The electronic devices 204a, 204b, 204c are electronic devices having wireless communication capabilities. Examples of electronic devices are smartphones, laptops, stationary computers and projectors, and robots. The one or more electronic devices 204a, 204b, 204c have wireless communication capabilities and can be wirelessly connected to the wireless access point 202. Alternatively, or in combination the one or more electronic devices 204a, 204b, 204c may be connected to a cellular network via a cellular radio base station 208. The connection to the cellular network may be made using any suitable connection protocol. Examples of such cellular network connection protocols are 3G, 4G, and 5G.

In the in FIG. 2 illustrated example, two electronic devices 204b, 204c are wirelessly connected to the wireless access point 202 servicing the portion 102 of the building 100 with wireless connection accessibility. Further, in the in FIG. 2 illustrated example, one electronic device 204a is wirelessly connected to the cellular network via the cellular radio base station 208.

For an electronic device wirelessly connected to the wireless access point 202 it may be said that the electronic device is present in the portion 102 of the building 100 associated with the wireless access point 202. The wireless access point 202 may determine which electronic device being wirelessly connected thereto, in the case of FIG. 2 electronic devices 204b, 204c. This can be monitored by software in the wireless access point 202. The wireless access point 202 may hence report to the server 106 which electronic devices that are wirelessly connected thereto. The wireless access point 202 may also send information to the server 106 about the type an electronic device. This information may be received by the wireless access point 202 from the electronic device wirelessly connected thereto. The wireless access point 202 may report to the server 106 when a new electronic device wirelessly connects thereto. The wireless access point 202 may report to the server 106 when an electronic device disconnects. Hence, the server 106 may get information about which electronic devices that are connected to the wireless access point 202. By this information it may be identified which electronic devices are identified as being present in the portion 102 of the building 100 associated with the wireless access point 202.

As mentioned above, an electronic device may be wirelessly connected to the cellular network via the cellular radio base station 208. Presence of such electronic device in the portion 102 of the building 100 may also be determined without such a device being wirelessly connected to the wireless access point 202. According to one example, the electronic device wirelessly connected to the cellular network via the cellular radio base station 208 has an application installed that monitors wireless access points and cellular radio base station the electronic device currently can detected. The monitoring may be of global cell identity, unique for each cellular radio base station, as well as MAC address, unique for each wireless access point. Every time an update of new cellular radio base station and/or new wireless access point within the radio range of the electronic device is detected, the application within the electronic device report the change (new wireless access point, new cellular radio base station, lost/dropped wireless access point, lost/dropped cellular radio base station etc.) to a server belonging to a wireless communication based positioning function. This server, in turn, has knowledge about the wireless access point 202 associated with the portion 102 of the building 100, e.g., knowledge about the MAC address of the wireless access point 202 associated with the portion 102 of the building 100. This server belonging to a wireless communication based positioning function monitor incoming MAC addresses reported from the electronic device having the application installed thereon and check whether the MAC addresses reported from the electronic device having the application installed thereon matches the MAC address of the wireless access point 202 associated with the portion 102 of the building 100. Once a match is detected, the server belonging to a wireless communication based positioning function reports the electronic device having the application installed thereon to the server 106 as being present in the portion 102 of the building 100. In case a match is not detected nothing is reported to server 106. Similarly, in case the electronic device having the application installed thereon no longer is in range of the wireless access point 202 associated with the portion 102 of the building 100 this will be reported to the server belonging to a wireless communication based positioning function who will report the same to the server 106. Hence, the server 106 will now get information about that the electronic device having the application installed thereon no longer is identified as being present in the portion 102 of the building 100.

The functions discussed above for determining whether an electronic device is located in the portion 102 of the building 100 are two different examples of wireless communication based positioning functions. However, any wireless communication based positioning function may be used for determining which electronic devices are present in the portion 102 of the building 100. Further, it is to be understood that the position of a specific electronic device may be determined using one or more wireless communication based positioning functions.

Each electronic device may be attributed with a heat dissipation. The heat dissipation may contribute to a change of an indoor climate. The amount of heat dissipation may be associated with the type of electronic device. The total amount of heat dissipation in a portion 102 of a building 100 may change the indoor climate significantly in that portion 102. For example, a laptop may output 40-50 W while a robot may output of 200 W. Heat dissipation values associated with specific types of electronic devices may be stored in a database. The server 106 may have access to such a database.

Further, a user 206, typically a human user but also an animal user, may be associated with an electronic device. Heat dissipation of such an associated user 206 may contribute to the total amount of heat dissipation in the portion 102 of a building 100. Typically, a human has a heat dissipation of 80-100 W.

Based on the information pertaining to the electronic devices, the server 106 may identify the electronic devices present in a specific portion 102 of a building 100. For each identified electronic device an amount of heat dissipation associated therewith may be determined. The server 106 may determine the amount of heat dissipation associated with each identified electronic device by accessing the database comprising heat dissipation values associated with specific types of electronic devices. From the individual contributions of heat dissipation from the identified electronic devices an estimated total amount of heat dissipation present in the portion 102 of the building 100 may be determined.

Alternatively, or in addition to electronic devices 204a, 204b, 204c, humans or other type of users 206 that are present in the portion 102 of the building 100 may affect the indoor climate by their heat dissipation. However, the users 206 cannot be directly identified as present in the portion 102 of the building 100 by means of a wireless communication based positioning function. Instead of directly detecting presence of a user 206, it may be checked whether an electronic device being identified as being present in the portion 102 of the building 100 is associated with a user 206. In case the electronic device being identified as present in the portion of the building 100 is associated with a user, heat dissipation contribution of that user may be added to the estimated total amount of heat dissipation present in the portion 102 of the building 100. For instance, if the electronic device is detected to be a smartphone, it can be assumed to be associated to a user. It may further be checked if two or more of the electronic devices identified as being present in the portion 102 of the building 100 is associated with the same user. This may be done by accessing a database (SIM card subscriptions for instance) over associations between electronic devices and users. If so that user will only contribute once to the estimated total amount of heat dissipation present in the portion 102 of the building 100. Further, it may be checked whether the user of a specific electronic device is currently logged into the electronic device and only if the user is logged into the electronic device it is determined that the user is present in the portion 102 of the building 100. This is especially useful for e.g. laptops. In connection with this, a user is determined as not logged into a laptop if the laptop has been locked. Another example useful for e.g. computers is to detect if an amount of data above a predetermined threshold, e.g. a threshold above ping data, is communicated with the wireless access point. In case the amount of data is above the predetermined threshold it may be assumed that a user is using the computer.

The server 106 may then generate an indoor climate control signal to be sent to the indoor climate control assembly 104 of the specific portion 102 of the building 100. The indoor climate control signal is based on the estimated total amount of heat dissipation present in the specific portion 102 of the building 100. Based on the indoor climate control signal, the indoor climate control assembly 104 will control the indoor climate by increasing or reducing heating, cooling or the ventilation in the portion 102 of the building 100.

As an example, if there are one or more electronic devices newly being present in the portion 102 of the building, the indoor climate control signal will be indicative of an increased heat dissipation in the portion 102 of the building 100. The indoor climate control assembly 104 may then be set to reduce the heating in the portion 102 of the building increase the cooling in the portion 102 of the building 100 and/or increase the ventilation in the portion 102 of the building 100.

As another example, if there are one or more electronic devices that recently left the portion 102 of the building 100, the indoor climate control signal will be indicative of a decreased heat dissipation in the portion 102 of the building 100. The indoor climate control assembly 104 may then be set to reduce the cooling in the portion 102 of the building 100, increase the heating in the portion 102 of the building and/or decrease the ventilation in the portion 102 of the building 100.

Figure 3:
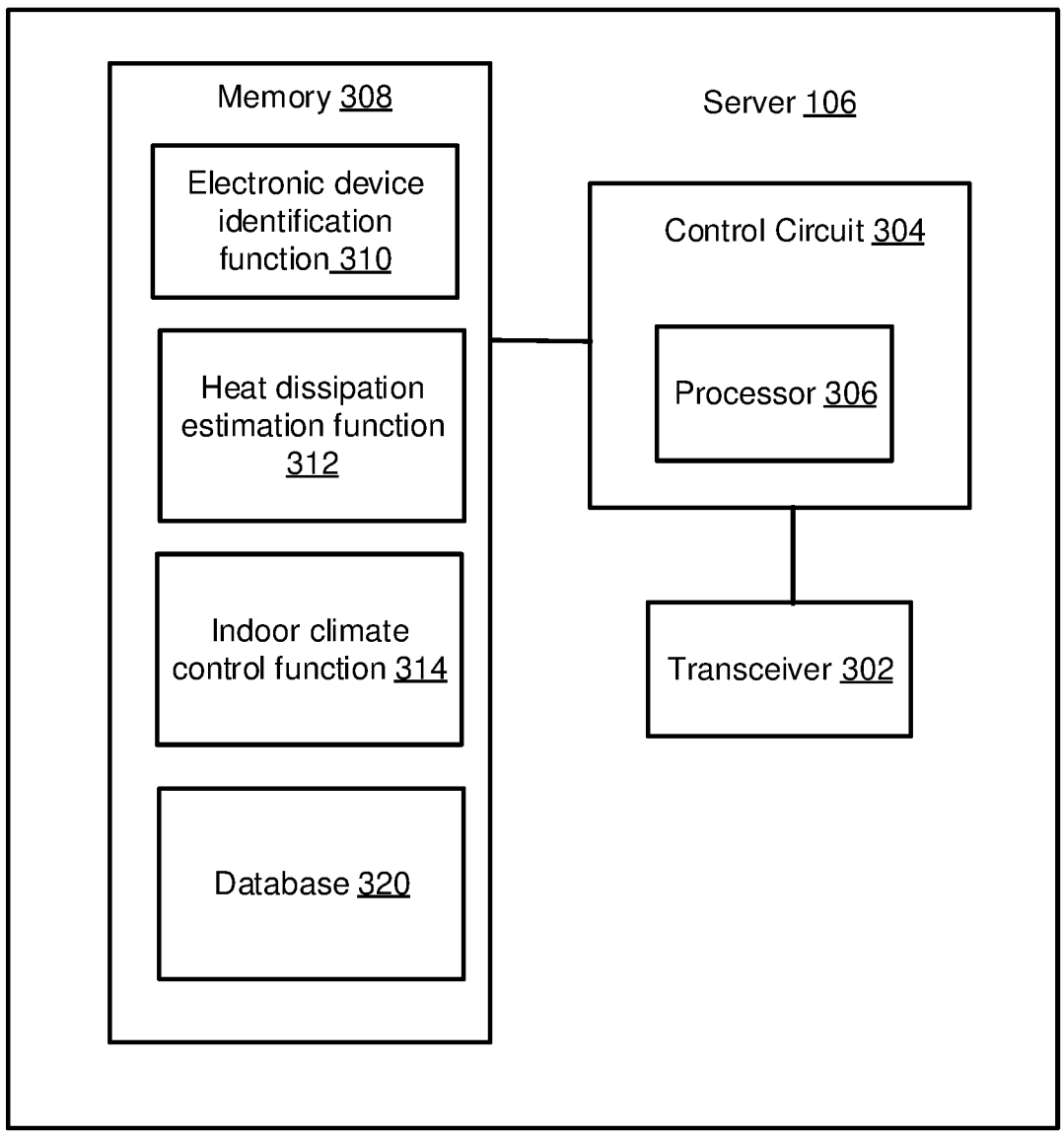
FIG. 3 is a schematic diagram of a server configured to control indoor climate in portions of the building of FIG. 1.

In connection with FIG. 3 the server 106 will be discussed in more detail. The server 106 comprises a transceiver 302, a control circuit 304 and a memory 308.

The transceiver 302 is configured to communicate with indoor climate control assemblies 104 associated with the different portions 102 of the building 100. The transceiver 302 is further configured to communicate with the wireless access points 202 associated with the different portions 102 of the building 100. The communication may include data transfers, and the like. Data transfers may include, but are not limited to, downloading and/or uploading data and receiving and sending messages. The data may be processed by the server 106. The processing may include storing the data in a memory, e.g., the memory 308 of the server 106, executing operations or functions, and so forth.

The control circuit 304 is configured to carry out overall control of the operations and functions of the server 106. The control circuit 304 may include a processor 306, such as a central processing unit (CPU), microcontroller or microprocessor. The processor 306 is configured to execute program code stored in the memory 308, in order to carry out operations and functions of the server 106.

The memory 308 may be one or more of a buffer, a flash memory, a hard drive, a removable media, a volatile memory, a non-volatile memory, a random access memory (RAM) or another suitable device. In a typical arrangement, the memory 308 may include a non-volatile memory for long term data storage and a volatile memory that functions as system memory for the control circuit 304. The memory 308 may exchange data with the control circuit 304 over a data bus. Accompanying control lines and an address bus between the memory 308 and the control circuit 304 also may be present.

Operations and functions of the server 106 may be embodied in the form of executable logic routines (e.g., lines of code, software programs etc.) that are stored on a non-transitory computer readable recording medium (e.g., the memory 308) of the server 106 and are executed by the control circuit 304 (e.g., using the processor 306). Furthermore, the operations and functions of the server 106 may be a stand-alone software application or form a part of a software application that carries out additional tasks related to the server 106. The described operations and functions may be considered a method that the corresponding device is configured to carry out. Also, while the described operations and functions may be implemented in software, such functionality may as well be carried out via dedicated hardware or firmware, or some combination of hardware, firmware and/or software.

The control circuit 304 is configured to execute an electronic device identification function 310. The electronic device identification function 310 is configured to identify electronic devices present in a portion 102 of a building 100. The electronic device identification function 310 uses one or more wireless communication based positioning functions in order to identify presence of an electronic device in a specific portion 102 of the building 100. Wireless communication based positioning functions are discussed in more detail above in connection with FIG. 2. In order to avoid undue repetition, reference is made to the above.

The control circuit 304 is further configured to execute a heat dissipation estimation function 312. The heat dissipation estimation function 312 is configured to determine an estimated total amount of heat dissipation present in the specific portion 102 of the building 100. The estimated total amount of heat dissipation present in the specific portion 102 of the building 100 may be based on heat dissipation associated with the electronic devices identified as being present in the specific portion 102 of the building 100. Hence, the heat dissipation estimation function 312 may be configured to determine a total amount of heat dissipation associated with the electronic devices identified as being present in the specific portion 102 of the building 100. The heat dissipation estimation function 312 may be configured to determine the total amount of heat dissipation by, for each of the electronic device identified as being present in the specific portion 102 of the building 100, determine an amount of heat dissipation associated with the identified electronic device. This may e.g. be made by accessing a database comprising heat dissipation values associated with specific types of electronic devices. The database may be a database 320 stored in the memory 308 of the server 106. Alternatively, the database may be external from the server 106 but being accessible by the server 106. By identifying the type of identified electronic device and accessing the database, the heat dissipation estimation function 312 may estimate the heat dissipation of the identified electronic device. The heat dissipation estimation function 312 may further be configured to sum the heat dissipation contributions from the identified electronic devices determining the estimated total amount of heat dissipation present in the specific portion 102 of the building 100. As mentioned in connection with the discussion of FIG. 2 also users 206 of the electronic devices may contribute to the estimated total amount of heat dissipation present in the specific portion 102 of the building 100. Hence, the heat dissipation estimation function 312 may be configured to determine the total amount of heat dissipation based on heat dissipation contribution from users being present in the specific portion 102 of the building 100. The heat dissipation estimation function 312 may then be configured to check whether an electronic device being identified as being present in the portion 102 of the building 100 is associated with a user 206. In case the electronic device being identified as present in the portion 102 of the building 100 is associated with a user, the heat dissipation estimation function 312 may add a heat dissipation contribution of that user to the estimated total amount of heat dissipation present in the portion 102 of the building 100. The heat dissipation estimation function 312 may further be configured to check whether two or more of the electronic devices identified as being present in the portion 102 of the building 100 is associated with the same user. If so, the heat dissipation estimation function 312 will only add one user contribution to the estimated total amount of heat dissipation present in the portion 102 of the building 100. Further, the heat dissipation estimation function 312 may check whether the user of a specific electronic device is currently logged into the electronic device. Only if the user is logged into the electronic device it is determined that the user is present in the portion 102 of the building 100. This is especially useful for e.g. laptops. In connection with this, a user is determined as not logged into a laptop if the laptop has been locked.

The control circuit 304 is further configured to execute an indoor climate control function 314. The indoor climate control function 314 is configured to generate an indoor climate control signal. The indoor climate control signal is to be sent to an indoor climate control assembly 104 associated with the portion 102 of the building 100. The indoor climate control signal is based on the estimated total amount of heat dissipation present in the specific portion 102 of the building 100.

Hence, by identifying electronic devices 204a, 204b, 204c present in the portion 102 of the building 100 and by analyzing what type of electronic devices the identified electronic devices are, the server 106 may control the indoor climate in the portion 102 of the building 100. The identification of electronic devices being present in the portion 102 of the building 100 is based on wireless communication based positioning functions.

Figure 4:
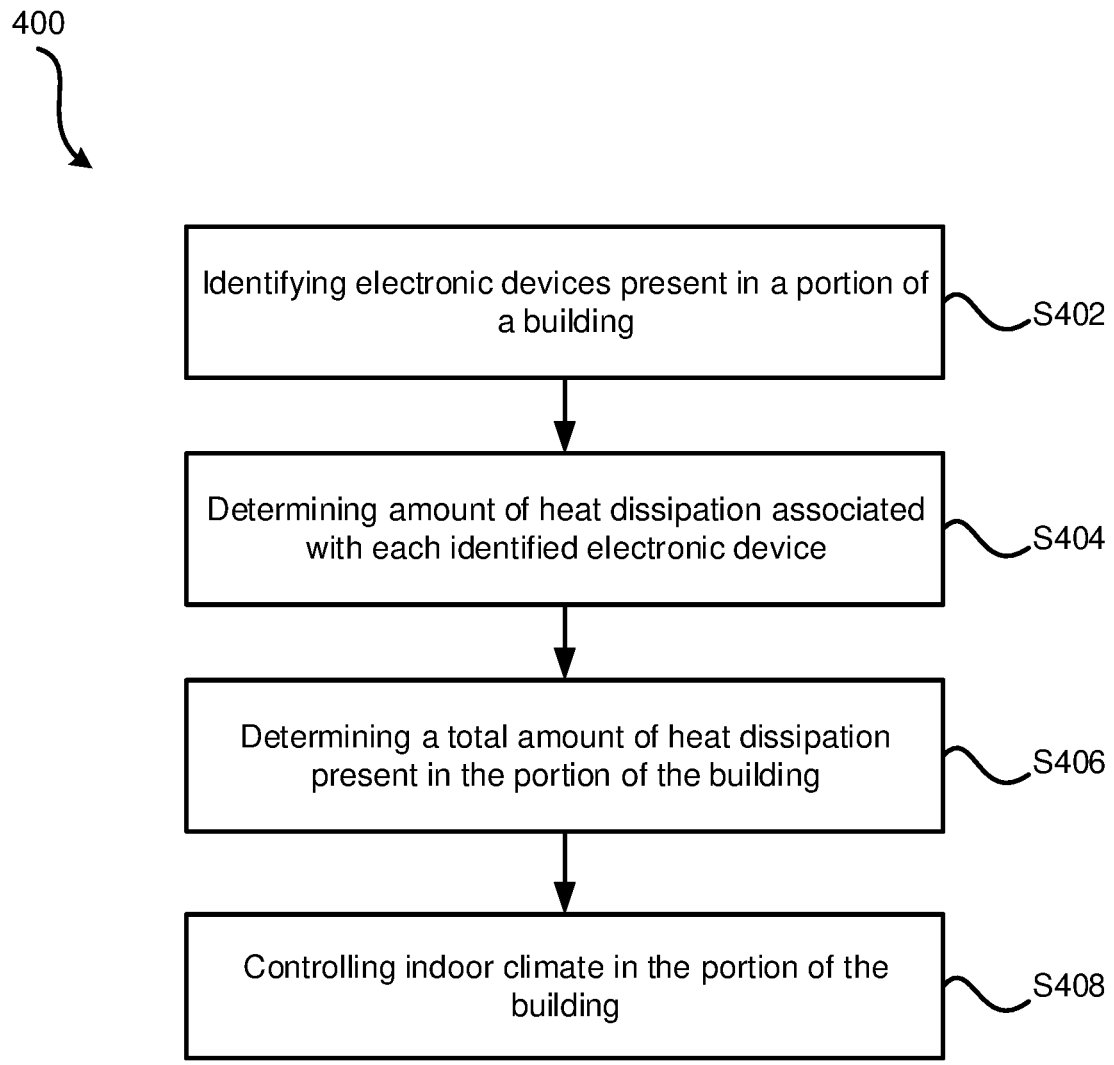
FIG. 4 is a flow chart illustrating a method for controlling indoor climate in a portion of a building.

In connection with FIG. 4, a method 400 for controlling indoor climate in a portion of a building will be discussed. The steps of the method 400 may be performed in any order suitable. The method 400 comprises the following steps.

Identifying S402 electronic devices present in the portion of the building. The step of identifying S402 electronic devices present in the portion of the building is based on wireless communication based positioning functions. These functions are discussed in connection with FIG. 2. In order to avoid undue repetition, reference is made to the above.

For each identified electronic device, an amount of heat dissipation associated with the identified electronic device may be determined S404. Step S404 may comprise determining a type of the identified electronic device and based on that determining an amount of heat dissipation associated therewith. The type of identified electronic device may be comprised in information sent from the electronic device. The amount of heat dissipation associated with a specific type of electronic device may be determined by accessing a database comprising information pertaining to heat dissipation associated with different types of electronic devices.

The amount of heat dissipation associated with the identified electronic devices may then be used for determining S406 an estimated total amount of heat dissipation present in the portion of the building. The step of determining S406 an estimated total amount of heat dissipation present in the portion of the building may comprising summing the determined amounts of heat dissipation associated with the electronic devices identified as being present in the portion of the building. Hence, the estimated total amount of heat dissipation present in the portion of the building may comprise a sum of determined amounts of heat dissipation associated with the electronic devices identified as being present in the portion of the building. The step of determining S406 an estimated total amount of heat dissipation present in the portion of the building may comprise, for each of the electronic devices identified as being present in the portion of the building, determining whether the electronic device is associated with a user, and upon the electronic device is associated with a user, adding an amount of heat dissipation associated with the user to the estimated total amount of heat dissipation present in the portion of the building. Hence, the estimated total amount of heat dissipation present in the portion of the building may comprise an amount of heat dissipation associated with user of the electronic devices identified as being present in the portion of the building. Further, the respective user may be identified, and the adding of an amount of heat dissipation associated with a user to the estimated total amount of heat dissipation present in the portion of the building may only be made for each uniquely identified user. Hence, the estimated total amount of heat dissipation present in the portion of the building may comprise an amount of heat dissipation associated with each uniquely identified user of the electronic devices identified as being present in the portion of the building. Accordingly, the estimated total amount of heat dissipation present in the portion of the building may comprise heat dissipation associated with electronic devices identified as being present in the portion of the building together with humans, or other users, associated with the electronic devices identified as being present in the portion of the building.

Based on the estimated total amount of heat dissipation present in the portion of the building, controlling S408 the indoor climate in the portion of the building. The controlling S408 of the indoor climate in the portion of the building may comprise controlling heating in the portion of the building. The controlling S408 of the indoor climate in the portion of the building may comprise controlling cooling in the portion of the building. The controlling S408 of the indoor climate in the portion of the building may comprise controlling ventilation of the portion of the building.

The method 400 for controlling indoor climate in a portion of a building may be individually performed for each portion of a plurality of portions in the building.

The person skilled in the art realizes that the present invention by no means is limited to the preferred embodiments described above. On the contrary, many modifications and variations are possible within the scope of the appended claims.

For example, information about heat dissipation for a specific electronic device may be transmitted from the specific electronic device itself. For example, the wireless access point 202 may relay such information to the server 106.

Furthermore, the indoor climate control assemblies 104 may comprise a humidity control device configured to control a humidity in the portion of the building. The indoor climate control signal may then comprise information pertaining to how to control the humidity in the portion of the building. The server may be configured to generate the humidity information in the indoor climate control signal based on the estimated total heat dissipation in the portion of the building.

Additionally, variations to the disclosed embodiments can be understood and effected by the skilled person in practicing the claimed invention, from a study of the drawings, the disclosure and the appended claims.

The invention claimed is:

1. A method for controlling indoor climate in a portion of a building, the method comprising:
    identifying, based on a wireless communication based positioning function, electronic devices present in the portion of the building;
    for each identified electronic device:
        determining whether the identified electronic device is associated with a user; and determining whether the user is logged into the electronic device;
determining an estimated total amount of heat dissipation present in the portion of the building based on an amount of heat dissipation associated with the respective user to which the respective identified logged in electronic device is associated; and
controlling indoor climate in the portion of the building based on the estimated total amount of heat dissipation present in the portion of the building.

2. The method according to claim 1, further comprising:
identifying the respective user; and
determining the estimated total amount of heat dissipation present in the portion of the building based on a summation of the amount of heat dissipation associated with each uniquely identified user.

3. The method according to claim 1, further comprising:
for each identified electronic device:
determining an amount of heat dissipation associated with the identified electronic device; and
adding the amount of heat dissipation associated with the identified electronic device to the estimated total amount of heat dissipation present in the portion of the building.

4. The method according to claim 3, wherein the step of, for each identified electronic device, determining an amount of heat dissipation associated with the identified electronic device comprises:
determining a type of the electronic device and accessing a database comprising information pertaining to heat dissipation associated with different types of electronic devices.

5. The method according to claim 1, wherein the step of identifying electronic devices present in the portion of the building comprises:
at least one of identifying the electronic devices wirelessly connected to a wireless access point associated with the portion of the building and identifying electronic devices being within a range of the wireless access point associated with the portion of the building.

6. The method according to claim 1, wherein the step of controlling indoor climate in the portion of the building comprises controlling heating and/or cooling of the portion of the building.

7. The method according to claim 1, wherein the step of controlling indoor climate in the portion of the building comprises controlling ventilation of the portion of the building.

8. A method for individually controlling indoor climate in each portion of a plurality of portions in a building, the method comprising:
for each portion of the building performing the method according to claim 1.

9. A non-transitory computer readable recording medium comprising program code portions recorded thereon which when executed on a device having processing capability is configured to perform the method of claim 1.

10. A server configured to control indoor climate in a portion of a building, the server comprising:
a control circuitry configured to execute:
an electronic device identification function configured to identify electronic devices present in the portion of the building based on a wireless communication based positioning function,
a heat dissipation estimation function configured to determine an estimated total amount of heat dissipation present in the portion of the building based on a summation of amounts of heat dissipation associated with users associated with the electronic devices identified as being present in the portion of the building, wherein the users are identified based on associated electronic devices of the users that are currently logged in,
an indoor climate control function configured to generate an indoor climate control signal, wherein the indoor climate control signal is based on the estimated total amount of heat dissipation present in the portion of the building; and
a transceiver configured to send the indoor climate control signal to an indoor climate control assembly associated with the portion of the building.

11. The server according to claim 10, wherein the heat dissipation estimation function is further configured to determine the estimated total amount of heat dissipation present in the portion of the building based on a summation of amounts of heat dissipation associated with the identified electronic device.

12. A building management system comprising:
a plurality of indoor climate control assemblies, each associated with an individual portion of a building; and
a server configured to individually control indoor climate in the individual portions of the building, the server comprising:
a control circuitry configured to execute:
an electronic device identification function configured to identify electronic devices present in each individual portion of the building that are currently logged in, based on a wireless communication based positioning function,
a heat dissipation estimation function configured to determine an estimated total amount of heat dissipation present in each individual portion of the building based on a summation of amounts of heat dissipation associated with users associated with the logged in electronic devices identified as being present in the individual portion of the building,
an indoor climate control function configured to for each individual portion of the building generate an indoor climate control signal, wherein each indoor climate control signal is based on the estimated total amount of heat dissipation present in the individual portion of the building; and
a transceiver configured to send the indoor climate control signals to a respective one of the indoor climate control assemblies associated with the individual portion of the building.

13. The building management system according to claim 12, wherein the heat dissipation estimation function is further configured to determine the estimated total amount of heat dissipation present in the individual portion of the building based on a summation of amounts of heat dissipation associated with the electronic devices identified as being present in the individual portion of the building.

14. The building management system according to claim 12, further comprising a plurality of wireless access points, wherein each wireless access point is associated with each individual portion of the building, wherein the electronic device identification function is configured to identify electronic devices present in an individual portion of the building by identifying electronic device wirelessly connected to the wireless access point associated the individual portion of the building and/or identifying electronic devices being within a range of the wireless access point associated with the portion of the building.

15. The building management system according to claim 12, wherein each of the plurality of indoor climate control assemblies comprises one or more of: a heating device configured to heat the individual portion of the building associated with the indoor climate control assembly, a cooling device configured to cool the individual portion of the building associated with the indoor climate control assembly, and a ventilation device configured to ventilate the individual portion of the building.

16. The method according to claim 1, further comprising determining that a particular user is associated with a plurality of the electronic devices in the portion of the building, and in response to determining that the particular user is associated with the plurality of the electronic devices, including heat dissipation associated with the particular user to the estimated total amount of heat dissipation once.

\* \* \* \* \*